United States Patent
Butler et al.

(10) Patent No.: US 6,831,810 B1
(45) Date of Patent: Dec. 14, 2004

(54) DISK DRIVE ENABLING SIMULTANEOUS ASSEMBLY OF HSA AND DISK PACK

(75) Inventors: Walter W. Butler, Scotts Valley, CA (US); Robert E. Lloyd, Livermore, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 134 days.

(21) Appl. No.: 10/232,867

(22) Filed: Aug. 30, 2002

(51) Int. Cl.[7] .......................... G11B 5/54; G11B 33/00
(52) U.S. Cl. ............................ 360/97.01; 360/264.3; 360/265.6
(58) Field of Search .................... 360/97.01, 98.01, 360/264.1, 264.3, 265.6

(56) References Cited

U.S. PATENT DOCUMENTS

| | | | |
|---|---|---|---|
| 6,205,004 B1 * | 3/2001 | Kim ........................ | 360/264.1 |
| 6,285,524 B1 * | 9/2001 | Boigenzahn et al. .... | 360/97.01 |
| 6,469,864 B2 * | 10/2002 | Kamezawa et al. ...... | 360/97.01 |
| 6,570,736 B2 * | 5/2003 | Noda ....................... | 360/97.01 |
| 6,577,474 B2 * | 6/2003 | Kazmierczak et al. ... | 360/264.9 |
| 6,693,767 B1 * | 2/2004 | Butler ..................... | 360/97.01 |
| 2001/0000022 A1 * | 3/2001 | Shiroishi ................... | 360/324 |
| 2001/0015869 A1 * | 8/2001 | Kamezawa et al. ...... | 360/97.01 |
| 2002/0191330 A1 * | 12/2002 | Ohba et al. .............. | 360/97.01 |

* cited by examiner

Primary Examiner—Jefferson Evans
(74) Attorney, Agent, or Firm—Won Tae C. Kim, Esq.; Milad G. Shara, Esq.; Alan W. Young, Esq.

(57) ABSTRACT

A disk drive has an enclosure that includes a first portion and a second portion that is configured to mate with the first portion. A spindle motor is attached to the first portion and a disk is mounted to the spindle motor. A head stack assembly is pivotally coupled to the second portion prior to the first and second portions being mated to one another. The head stack assembly includes a read write head that is configured to read from and write to the recording surface of the disk after the first and second portions are mated to one another.

8 Claims, 5 Drawing Sheets

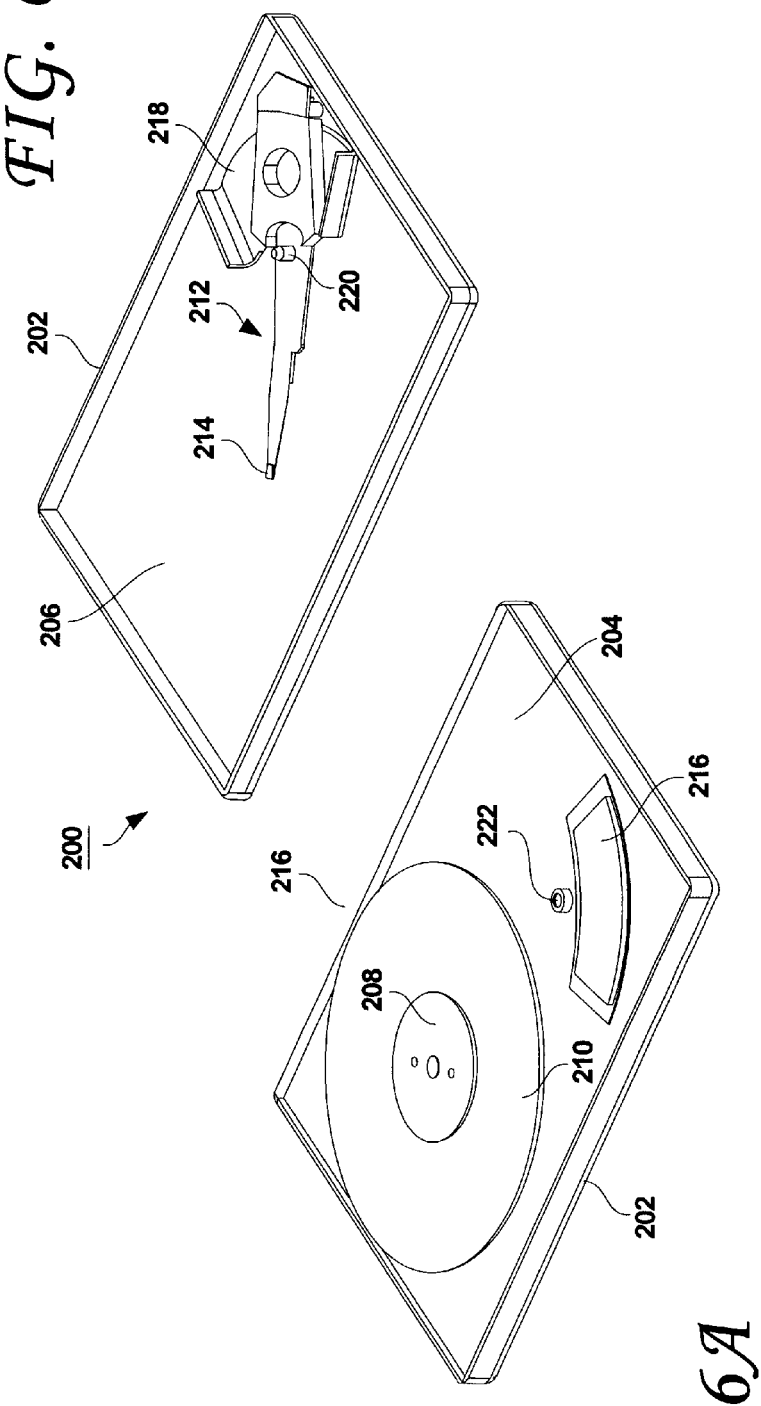

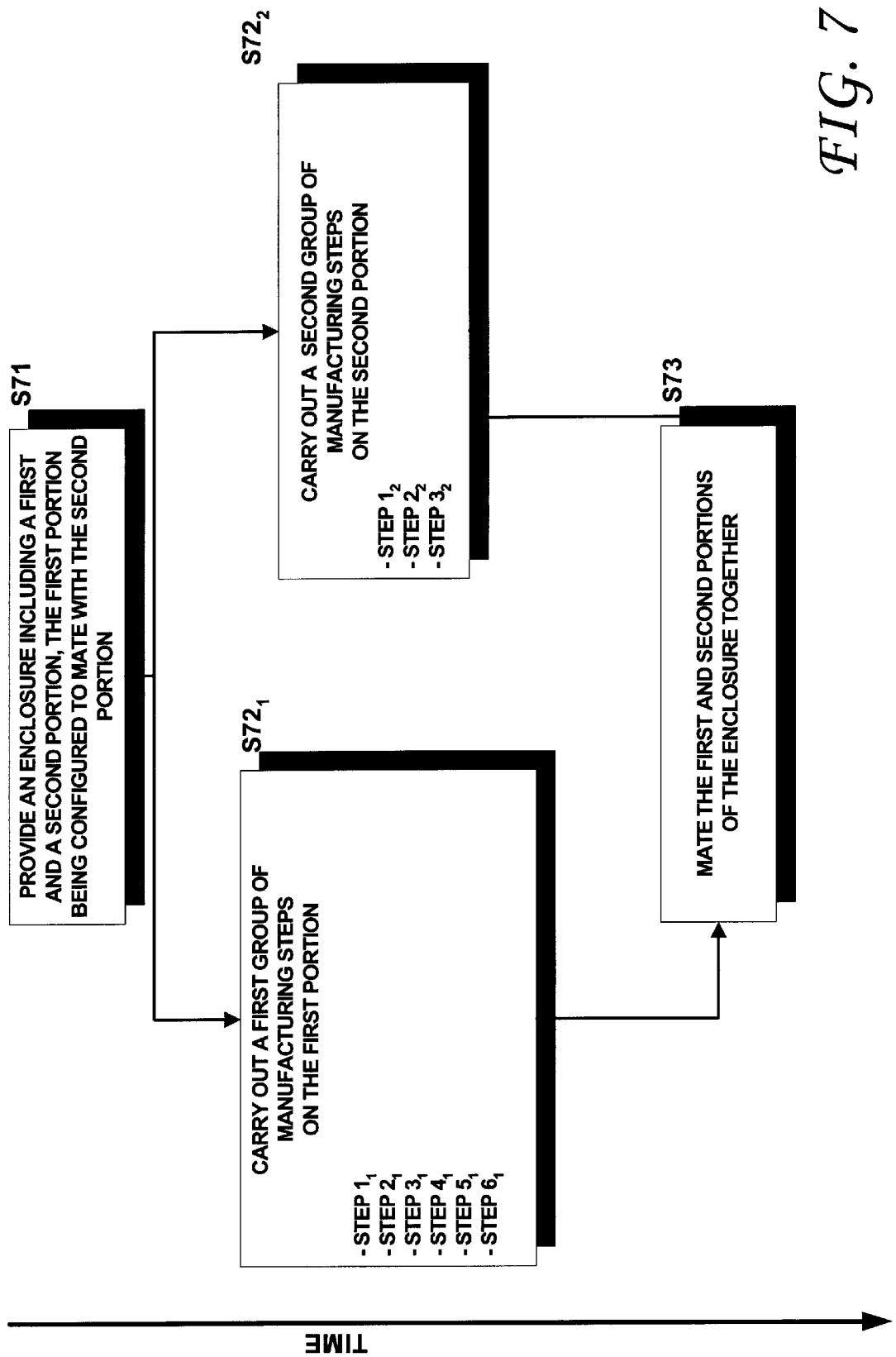

DISK DRIVE ENABLING SIMULTANEOUS ASSEMBLY OF HSA AND DISK PACK

BACKGROUND OF THE INVENTION

1. Field of the Invention

The present invention relates to disk drives. More particularly, the present invention relates to methods of manufacturing disk drives and to disk drives having an enclosure that includes a first and a second portion in which drive manufacturing steps may be carried out on both the first and second portions simultaneously.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the head on the gimbal attached to the load beam. The transfer rate of the data signals is a function of rotational speed of the spindle motor; the faster the rotational speed, the higher the transfer rate. A spindle motor is essentially an electromagnetic device in which the electromagnetic poles of a stator are switched on and off in a given sequence to drive a hub or a shaft in rotation, the hub including a permanent magnetic ring.

FIG. 1 shows the principal components of a magnetic disk drive 100 constructed in accordance with the prior art. With reference to FIG. 1, the disk drive 100 is an Integrated Drive Electronics (IDE) drive comprising a HDA 144 and a PCBA 114. The HDA 144 includes a base 116 and a separate, discrete cover 117 attached to the base 116 that collectively house a disk stack 123 that includes a plurality of magnetic disks (of which only a first disk 111 and a second disk 112 are shown in FIG. 1), a spindle motor 113 attached to the base 116 for rotating the disk stack 123, an HSA 120, and a pivot bearing cartridge 184 (such as a stainless steel pivot bearing cartridge, for example) that rotatably supports the HSA 120 on the base 116. The base 116 is typically attached to the separate cover 117 by means of screws or other discrete fasteners. The spindle motor 113 rotates the disk stack 123 at a constant angular velocity about a spindle motor rotation axis 175. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head. The flex cable assembly 180 includes a flex circuit cable and a flex clamp 159. The HSA 120 is pivotally secured to the base 116 via the pivot-bearing cartridge 184 so that the head at the distal end of the HGA 110 may be moved over a recording surface of the disks 111, 112. The pivot-bearing cartridge 184 enables the HSA 120 to pivot about a pivot axis, shown in FIG. 1 at reference numeral 182. The storage capacity of the HDA 111 may be increased by including additional disks in the disk stack 123 and by an HSA 120 having a vertical stack of HGAs 110 supported by multiple actuator arms 160.

Current trends appear to favor ever-smaller drives for use in a wide variety of devices, such as digital cameras, digital video cameras and other audio-visual (AV) equipment and portable computing devices, for example. Concurrently, the highly competitive nature of the disk drive industry and the ever more stringent size constraints are driving disk drive manufacturers to finds ways to minimize costs. Simplifying the manufacturing process is one avenue that disk drive manufacturers are exploring, with the rationale that fewer manufacturing steps and fewer sequential manufacturing steps lead to a less costly drive. Toward that end, attention has turned to the drive enclosure as one possible candidate for further cost reductions. Indeed, it has been determined that an HDA configuration wherein the enclosure includes a base and a separate, discrete cover attached with screws might not be optimal, with respect to materials, cost and the number of manufacturing steps required to assemble the enclosure. Moreover, it would be advantageous if two or more manufacturing steps could be carried out simultaneously, on different sub-assemblies of the drive. This would increase manufacturing throughput, thereby further decreasing the cost of making the drives.

SUMMARY OF THE INVENTION

Accordingly, this invention may be regarded as a disk drive that includes an enclosure, the enclosure including a first portion and a second portion configured to mate with the first portion. A spindle motor is attached to the first portion and a disk is mounted to the spindle motor, the disk including a recording surface. A head stack assembly is pivotally coupled to the second portion prior to the first and second portions being mated to one another. The head stack assembly includes a read write head that is configured to read from and write to the recording surface when the first and second portions are mated to one another.

The enclosure defines an exterior surface, and may include a hinge that mechanically couples the first portion to the second such that the hinge forms a portion of the exterior surface of the enclosure. A first VCM back plate may be attached to the first portion and a second VCM back plate may be attached to the second portion. The disk drive may further include an HSA pivot post coupled to the second portion and a pivot post mating feature coupled to the first portion, the HSA pivot post coupling with the pivot post mating feature when the first and second portions of the enclosure are mated to one another.

The present invention may also be regarded as a method of manufacturing a disk drive. The method may include a step of providing an enclosure including a first and a second portion, the first portion being configured to mate with the second portion; carrying out a first group of manufacturing steps on the first portion including, for example, attaching a spindle motor to the first portion; attaching a disk having a recording surface to the spindle motor, and carrying out a second group of manufacturing steps on the second portion including, for example, attaching a head stack assembly to the second portion, at least one of the steps of the first group being carried out while at least one of the steps of the second group is being carried out.

The first group of manufacturing steps may include, for example, attaching a first VCM back plate to the first portion and the second group of manufacturing steps may include attaching a second VCM back plate to the second portion. A step of mating the first portion of the enclosure to the second portion of the enclosure may then be carried out.

The present invention is also a disk drive including an enclosure that includes a first enclosure portion and a second enclosure portion that mates with the first enclosure portion, the enclosure enclosing a head stack assembly and a disk pack that includes a spindle motor and a disk attached to the spindle motor, the disk drive being such that when the enclosure is opened and the first enclosure portion is unmated from the second enclosure portion, the disk pack is attached to the first enclosure portion and the head stack assembly is attached to the second enclosure portion.

The foregoing and other features of the invention are described in detail below and set forth in the appended claims.

BRIEF DESCRIPTION OF THE DRAWINGS

FIG. 6A shows the first portion of the enclosure of a disk drive according to another embodiment of the present invention, in which the first portion of the enclosure is separate from and independent of the second portion of the enclosure.

FIG. 6B shows the second portion of the enclosure of the disk drive of FIG. 6A, in which the second portion of the enclosure is separate from and independent of the first portion of the enclosure.

FIG. 7 is a flowchart that illustrates aspects of the method for manufacturing a disk drive according to an embodiment of the present invention.

DESCRIPTION OF THE PREFERRED EMBODIMENTS

Figure 1:
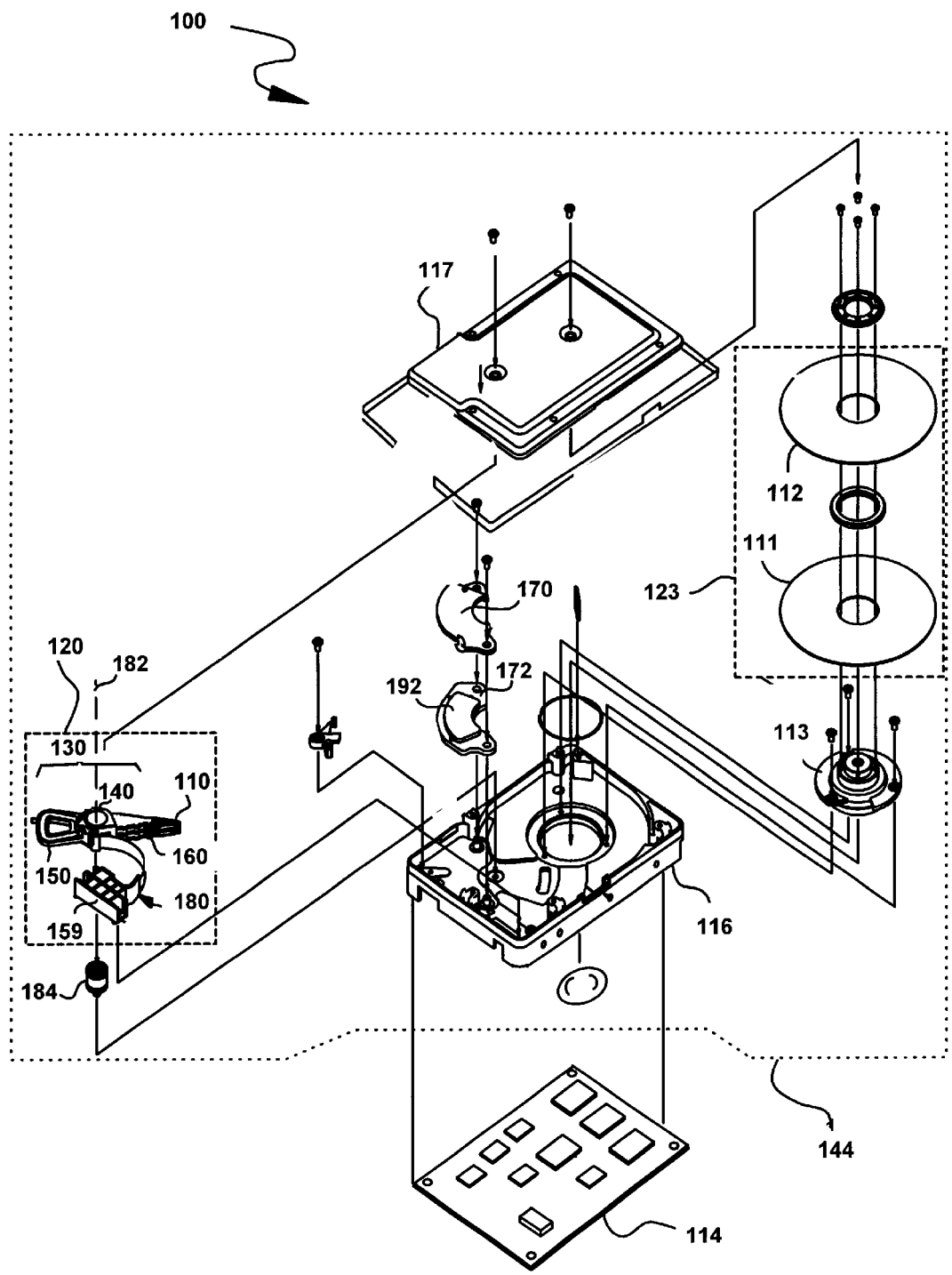
FIG. 1 is an exploded view of a conventional disk drive manufactured using a conventional top-down sequential assembly method.
Figure 2:
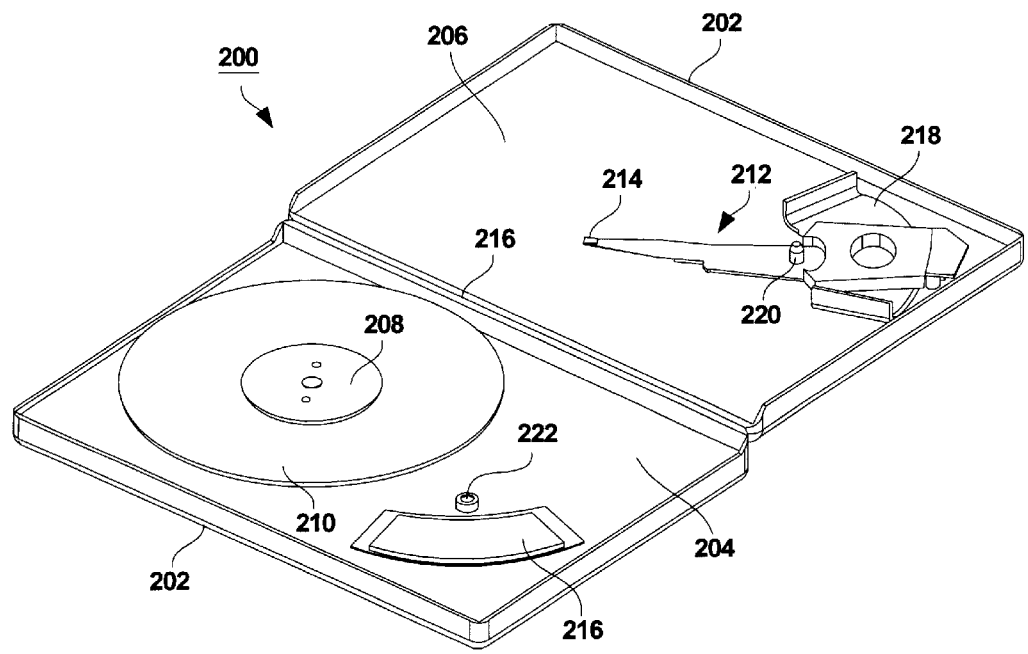
FIG. 2 is a perspective view of a disk drive according to an embodiment of the present invention, shown prior to the first portion of the enclosure being mated to the second portion of the enclosure.

FIG. 2 is a perspective view of a disk drive 200 having an enclosure 202. The enclosure 202 may include a first portion 204 and a second portion 206. The second portion 206 of the enclosure 202 is configured to mate with the first portion 204 of the enclosure 202. To increase the speed at which the drive 200 may be manufactured, the drive 200 includes some drive components that are attached, affixed or otherwise coupled to the first portion 204 and some other drive components that are attached, affixed or otherwise coupled to the second portion 206. According to an embodiment of the present invention and as shown in FIG. 2, the spindle motor 208 is attached to the first portion 204 and a disk 210 is mounted to the spindle motor 208. The disk 210 includes a recording surface, which is the surface of the disk 210 that is visible in FIG. 2. Other drive components may advantageously be mounted to the first portion 204 of the enclosure 202, as detailed below. According to this embodiment of the present invention, a head stack assembly 212 is pivotally coupled to the second portion 206 prior to the first and second portions 204, 206 being mated to one another. As shown, the head stack assembly 212 includes a read write head 214 that is configured to read from and write to the recording surface of the disk 210 when the first and second portions 204, 206 are mated to one another. That is, the disk drive 200 according to the present invention is configured to form an operational head-disk interface only after the first portion 204 of the enclosure 202 is mated with the second portion of the enclosure 202. By precise control of manufacturing tolerances on the enclosure 202, the head stack assembly 212 and the disk 210 (among other drive components), the head 214 is moved within an operational height over the recording surface of the disk 210 when the first portion 204 is mated to the second portion 206. To help insure the proper placement of the head stack assembly 212 relative to the disk 210, the disk 202 may include a pivot post 220 coupled to the second portion 206 and a pivot post mating feature 222 coupled to the first portion 204. As shown, the pivot post mating feature 222 may be shaped to receive and couple to the pivot post 220 when the first and second portions 204, 206 of the enclosure 202 are mated to one another. For example, the pivot post mating feature 222 may be shaped as a socket dimensioned and shaped so as to receive the pivot post 220. The pivot post mating feature 222 may be structured so as to guide the pivot post 220 and to correct for small misalignments. The pivot post 220 may, for example, be integrated into the pivot-bearing cartridge about which the head stack assembly 212 pivots. However, the pivot post 220 and its corresponding pivot mating feature 222 may be otherwise located, either on the first portion 204 or the second portion 206 of the enclosure. The disk drive 200 may further include a first VCM back plate 216 attached to the first portion 204 of the enclosure 202 and a second VCM back plate 218 attached to the second portion 206 of the enclosure 202. In this manner, when the first portion 204 is mated with the second portion 206, the drive's voice coil motor is completed, with the head stack assembly's coil configured so as enable it to sweep between the first and second VCM back plates 216, 218 in response to read and write commands from the host device.

The present invention enables different manufacturing steps to be simultaneously carried out on the first and second portions 204, 206 of the enclosure 202. For example, the second VCM back plate 218 and the head stack assembly 212 may be mounted to the second portion 206 of the enclosure 202 at the same time that the spindle motor 208 is coupled to the first portion 204, at the same time that the disk 210 is attached to the spindle motor 208 and/or at the same time as the first VCM back plate 216 is attached to the first portion 204. As those of skill in this art will note, other drive components may also be coupled to the first and second portions 204, 206, as the manufacturing sequence of the drive 200 allows. By utilizing both the first and second portions 204, 206 of the enclosure 202 as platforms on which drive components may be mounted, many manufacturing steps may be carried out in parallel. Moreover, the configuration of the drive according to the present invention prior to the first and second portions 204, 206 being mated to one another allows selected drive components to be pre-mounted on the first and/or second portions 204, 206 of the enclosure 202. For example, the drive manufacturer may outsource the manufacturing of the first and second portions 204, 206 of the enclosure 202 (or manufacture them in-house), and specify that the first portion 204 shall be delivered with the first VCM back plate 216 already integrated thereon. Likewise, the drive manufacturer may specify that the second portion 206 is to be delivered with the second VCM back plate 218 already mounted to and integrated therewith. Likewise, the spindle motor 208 may be fully integrated with the first portion 204 prior to receipt thereof by the drive manufacturer. For example, the enclosure 202 may be or include plastic formed by a molding process. One or more drive components may be molded into the first and/or second portion 204, 206, as detailed above.

Figure 3:
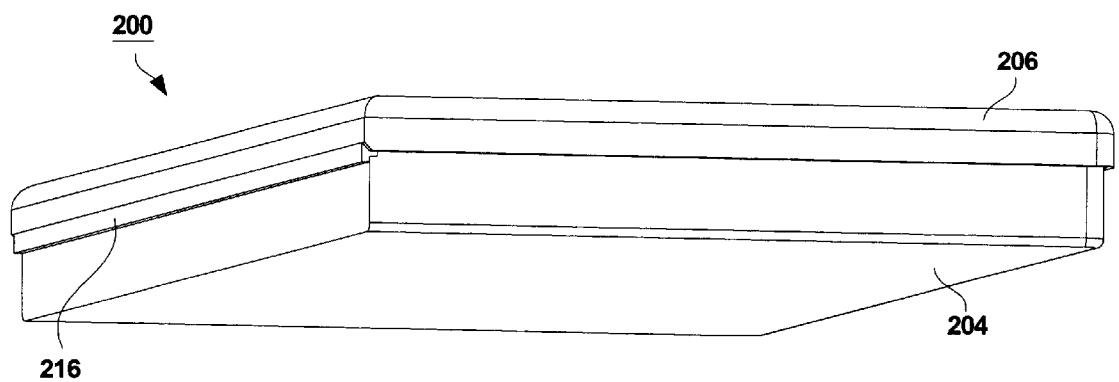
FIG. 3 is a perspective view of the disk drive of FIG. 2 after the first and second portions of the enclosure are mated to one another in a closed and sealed configuration.
Figure 4:
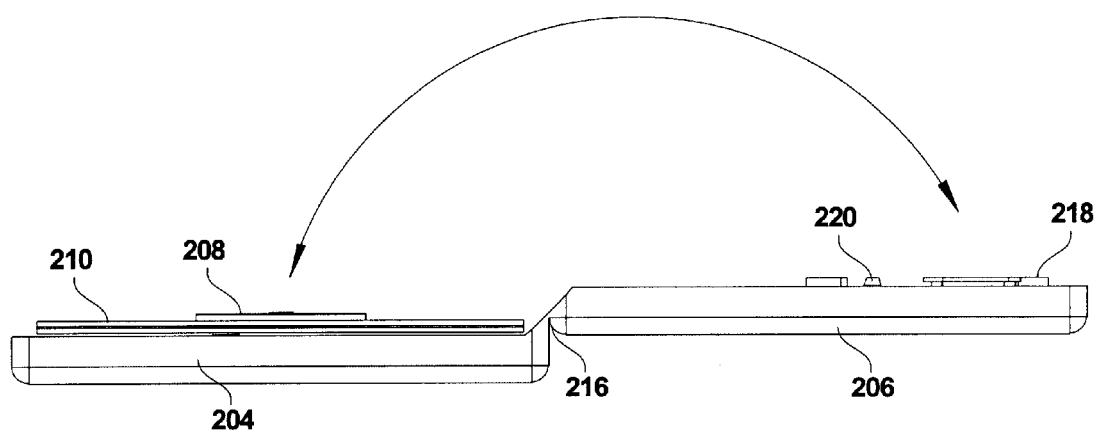
FIG. 4 is a side view of the disk drive of FIG. 2 prior to closing and sealing the drive.
Figure 5:
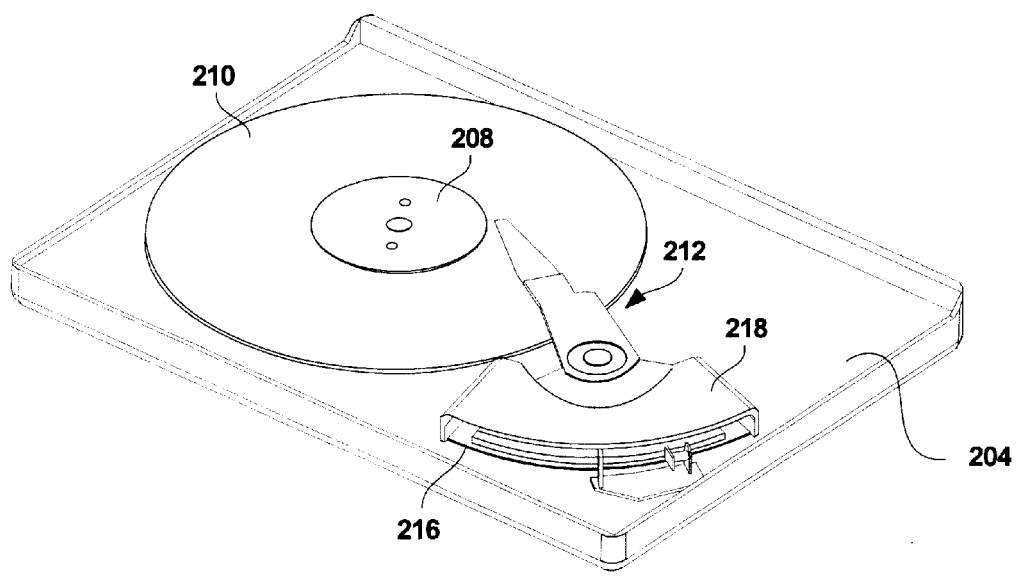
FIG. 5 is a perspective view of the disk drive according to an embodiment of the present invention, shown without the second portion of the enclosure, to illustrate the head-media interface created after the first and second portions of the enclosure are mated to one another.

According to an advantageous embodiment of the present invention, the enclosure 202 may define an exterior surface, best seen in FIG. 3 in which the first and second portions 204, 206 have been mated to one another and the drive 200 sealed. As shown, the enclosure 202 may include a hinge 216 that mechanically couples the first portion 204 to the second portion 206 such that the hinge 216 forms a portion of the exterior surface of the enclosure 202. In this manner, the enclosure 202 may be a unitary element and the first portion 204 thereof may be connected to the second portion 206 by a living hinge, such as hinge 216. To mate the first portion 204 to the second portion 206, the two portions 204, 206 may be simply folded until the first and second portions mate to one another and seal the internal components thereof within the internal space created by the mated first and second portions 204, 206. For example, suitable enclosures 202 for the disk drive according to the present invention are further described in copending and commonly assigned U.S. patent application Ser. No. 09/920,775 filed on Jul. 31, 2001, the disclosure of which is incorporated herein in its entirety.

Alternatively, the first and second portions 204, 206 may be separate portions of the enclosure, as shown in FIGS. 6A and 6B. As shown therein, the enclosure 202 does not include a hinge 416 and the first and second portions are shaped so as to mate to one another, preferably in a non-reversible manner. Other modifications will occur to those of skill in this art and all such modifications are deemed to fall within the scope of the present invention.

Identifying a disk drive 200 manufactured according to the teachings of the present invention is relatively straightforward. Indeed, when the enclosure 200 of a disk drive such as shown in FIG. 3 (fully mated) is opened and the first enclosure portion 204 is unmated from the second enclosure portion 206, one or more drive components will remain attached to the unmated second portion 206 and one or more other drive components will remain attached to the first portion 204. For example, the disk pack (e.g., spindle motor 208, disk 210) may remain attached to the first enclosure portion 204 and the head stack assembly 212 may remain attached to the second enclosure portion 206. Alternatively, it will be apparent that one or more components were attached to the first portion 204 and that one or more drive components were attached to the second portion 206 prior to the portions 204, 206 being mated to one another during the manufacture of the drive. For example, those of skill in this art may recognize that drive components initially attached to one of the portions 204, 206 may be configured so as to be captured by mating features on component(s) attached to the other one of the portions 204, 206 after the two portions 204, 206 are mated to one another.

FIG. 7 is a flowchart showing further aspects of the method for manufacturing a disk drive, according to an embodiment of the present invention. As shown therein, steps S71 calls for providing an enclosure including a first and a second portion that is configured to mate with the second portion. As suggested by the vertical arrow representing the passage of time, steps $S72_1$ and $S72_2$ (or at least a portion of steps $S72_1$ and $S72_2$) may be carried out simultaneously, although they need not start or end at the same time. As shown in step $S72_1$, the method calls for carrying out a first group of manufacturing steps on the first portion 204 of the enclosure 202. The manufacturing steps to be carried out on the first portion 204 are generically represented in FIG. 7 as steps $S1_1$, $S2_1$, $S3_1$, $S4_1$, $S5_1$ and $S6_1$. Such steps may include, for example, attaching a spindle motor 208 to the first portion 204, attaching a disk 210 having a recording surface to the spindle motor 208 and attaching a first VCM back plate to the first portion 204. Other drive components may advantageously be mounted onto the first portion 204 or onto another component that is already mounted thereon. The present invention allows one or more manufacturing steps to be carried out on the second portion 206 during at least one of the manufacturing steps that is carried out on the first portion 204. These are shown at step $S72_2$, which calls for carrying out a second group of manufacturing steps on the second portion 206. Such manufacturing steps carried out on the second portion 206 are suggested in step $S72_2$ by steps $S1_2$, $S2_2$ and $S3_2$. Such manufacturing steps may include, for example, attaching a head stack assembly to the second portion 206, attaching a crash stop assembly to the second portion 206 and securing a second VCM back plate thereto. Thereafter, as shown at step S73, the first portion 204 of the enclosure 202 may be mated to the second portion 206 of the enclosure 202.

What is claimed is:

1. A disk drive, comprising:
    an enclosure, including:
        a first portion;
        a second portion, the enclosure being configured to assume a first configuration in which the second portion is not mated with the first portion and a second configuration in which the second portion is mated with the first portion;
    a spindle motor attached to the first portion;
    a disk mounted to the spindle motor, the disk including a recording surface, and
    a head stack assembly pivotally coupled to the second portion, the head stack assembly including a read write head, wherein the read write head is configured to read from and write to the recording surface when the enclosure is in the second configuration.

2. The disk drive of claim 1, wherein the enclosure defines an exterior surface, and wherein the enclosure includes a hinge that mechanically couples the first portion to the second such that the hinge forms a portion of the exterior surface of the enclosure.

3. The disk drive of claim 1, further comprising:
    a first VCM back plate attached to the first portion, and
    a second VCM back plate attached to the second portion.

4. The disk drive of claim 1, further including an HSA pivot post coupled to the second portion and a pivot post mating feature coupled to the first portion, the HSA pivot post coupling with the pivot post mating feature when the enclosure is in the second configuration.

5. A method of manufacturing a disk drive, comprising:
providing an enclosure including a first and a second portion, the first portion being configured to mate with the second portion;
carrying out a first group of manufacturing steps on the first portion, including:
attaching a spindle motor to the first portion;
attaching a disk having a recording surface to the spindle motor, and
carrying out a second group of manufacturing steps on the second portion, including:
attaching a head stack assembly to the second portion,
wherein at least one of the steps of the first group is carried out while at least one of the steps of the second group is being carried out.

6. The method of claim 5, wherein the first group of manufacturing steps includes attaching a first VCM back plate to the first portion and wherein the second group of manufacturing steps includes attaching a second VCM back plate to the second portion.

7. The method of claim 5, further including a step of mating the first portion of the enclosure to the second portion of the enclosure.

8. A disk drive comprising an enclosure including a first enclosure portion and a second enclosure portion that mates with the first enclosure portion, the enclosure being configured to assume a closed configuration in which the first enclosure portion is mated to the second enclosure portion and an open configuration in which the first enclosure portion is unmated from the second enclosure portion, the enclosure enclosing a head stack assembly and a disk pack that includes a spindle motor and a disk attached to the spindle motor, wherein when the enclosure is in the open configuration, the disk pack is attached to the first enclosure portion and the head stack assembly is attached to the second enclosure portion.

* * * * *